Figure 1:
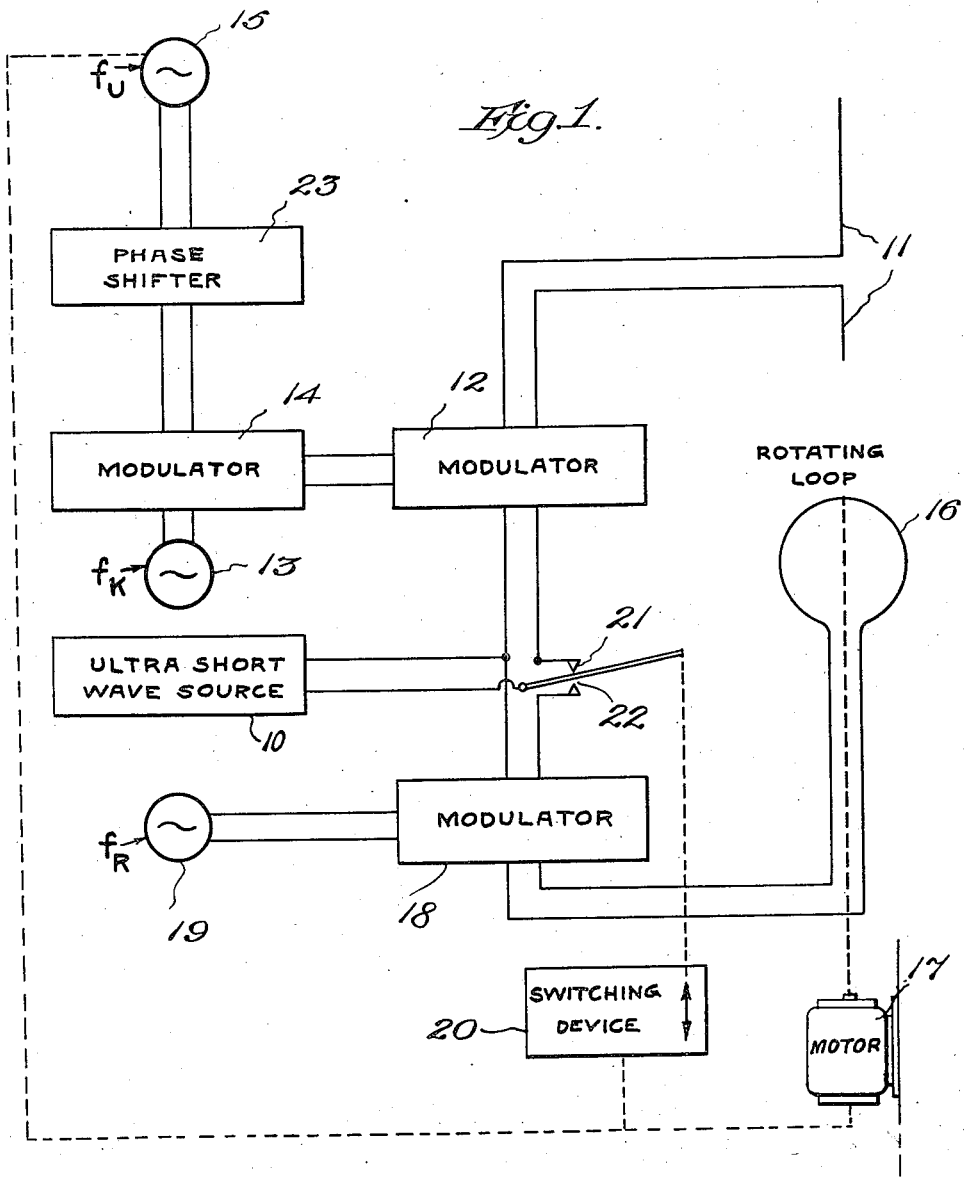

Jan. 30, 1945.  E. MÜLLER  2,368,318
RADIO SYSTEM FOR OBTAINING BEARINGS
Filed Oct. 10, 1941   2 Sheets-Sheet 2

Inventor:
Ernst Müller
by
Att'y

Patented Jan. 30, 1945

2,368,318

UNITED STATES PATENT OFFICE 2,368,318

RADIO SYSTEM FOR OBTAINING BEARINGS

Ernst Müller, Berlin, Germany; vested in the Alien Property Custodian

Application October 10, 1941, Serial No. 414,421
In Germany June 19, 1939

7 Claims. (Cl. 250—11)

In order to obtain bearings a rotating directive diagram or radiation pattern may be compared with the radiation of a second transmitter which is not directional but is suitably modulated. A rotating directive radiation pattern acts to produce at the receiving station a carrier modulated with the frequency of revolution or rotational frequency of this radiation pattern and also to produce after rectification an alternating current of the respective frequency. If such second non-directional transmitter, which operates on another carrier, is modulated with an alternating current whose frequency corresponds to the number of revolutions of the directive radiation pattern then at the receiving station, after rectifying this second carrier, the direction of the receiving station in relation to the transmitting station may be ascertained by comparing the phase conditions of the two alternating currents. Preferably, the phase of the alternating current from the second transmitter is so chosen that this current approaches zero whenever the zero direction of the rotating radiation pattern passes through north, for instance. The respective angle then is determined by way of a low frequency phase test.

This method, however, requires the use of two transmitters, namely, a transmitter for the rotating directive pattern and a transmitter for the broadcast radiation pattern. Accordingly two receivers are necessary at the receiving station.

According to the present invention a single transmitter is used for producing both the directional pattern and the broadcast pattern. The arrangement may be such that the two radiation patterns are emitted alternately one after the other. Preferably, the transmitter is an ultra-short wave transmitter. In order to distinguish between these patterns on the receiving side the transmitter when emitting the directional pattern is modulated with a frequency $f_R$ which, for instance, is 4000 cycles per second. During the time, however, during which the transmitter is emitting the broadcast pattern, this transmitter is modulated with a frequency $f_K$ which, for instance, is 5000 cycles and which in its turn is modulated with the rotational frequency $f_U$. The frequencies $f_R$ and $f_K$ are high compared with $f_U$. For instance, the rotational frequency $f_U$ may be 50 cycles, that is to say, the directional pattern rotates fifty times during each second. The arrangement may now be such that the ultra-short wave transmitter shall emit the directional pattern during 1/50 of a second, that is, during one revolution of the directional pattern, at a modulated frequency of say 4000 cycles, and that thereafter it shall emit, likewise during 1/50 of a second, the broadcast diagram at a modulating frequency of 5000 cycles which in its turn is modulated with 50 cycles, that is, with the rotational frequency, this having been assumed to be 50 cycles per second. The modulation frequencies will of course be in the audio range.

On the receiving side the directional pattern will be received as a sine frequency of 50 cycles, as will be also the broadcast pattern after rectification, the two incoming waves, however, distinguishing from each other by the group frequencies $f_K$ and $f_R$.

Furthermore, according to the invention the frequencies $f_K$ and $f_R$ are on the receiving side separated from each other by audio frequency filters and rectified. In this way, the frequencies are converted into pulsating currents of 50 cycles each. These currents are conveyed to a phase testing device by which the phase conditions of the two incoming oscillations may be ascertained. Preferably, the phase testing device is an arrangement that comprises two motors and a differential gearing by which the motors are coupled together. The motors are arranged to run in opposite directions. In the case of phase coincidence the planetary wheels of the differential gearing remain in the zero position. Whenever the phase condition varies the planetary wheels are thereby caused to move. For instance, in the event of 360° phase shift they move by 180° from the zero position in which they are in the case of phase coincidence. The position of the planetary wheels thus is a basis for ascertaining the phase condition of the two alternating currents. The motors, by virtue of their moment of inertia, remain in step even if a voltage happens to fail for a short time that may amount to several periods. With the novel method, as thus far described, such periods of no voltage arise through the fact that between two successive rotations of the directive pattern there is a pause during which the broadcast pattern is emitted. In order to do away with this period of no voltage the invention further proposes that on the receiving side the two continuous currents, pulsating at 50 cycles each, be each conveyed to an oscillatory circuit tuned to the rotational frequency, that is, 50 cycles in the present case, and excited by the pulsating continuous currents. Each of the two oscillatory circuits generates a continuous sine frequency that corresponds to the rotational frequency of 50 cycles.

Figure 5A:
Figure 5B:
Figure 6:
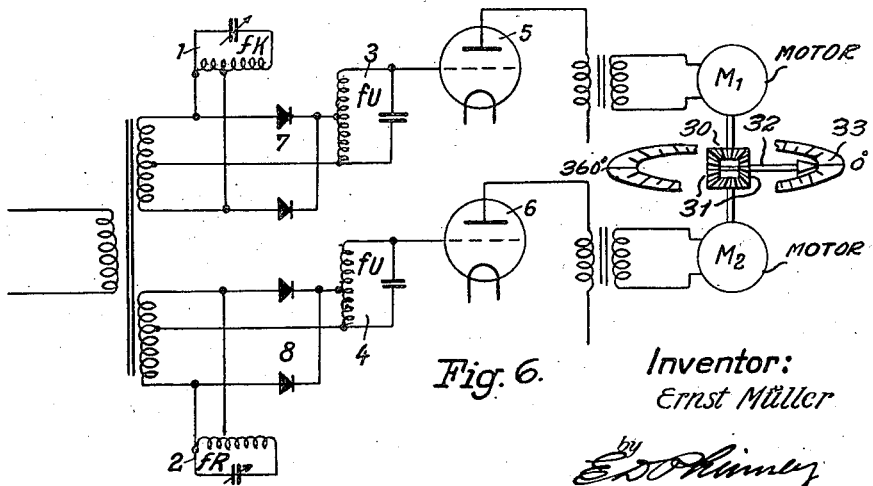

The drawings illustrate the conditions prevailing on both the transmitting and receiving sides. Fig. 1 is a diagram showing a radio beacon transmitting station illustrative of the invention, Figs. 2, 3, 4, 5a and 5b are graphs referred to in explaining the invention, and Fig. 6 is a diagram showing the output circuit of a receiver as provided by the invention.

In Fig. 1, the ultra short wave source 10 feeds waves over contacts 21 to the open vertical radiator 11, having a non-directive or broadcast radiation pattern. A wave of frequency $f_U$ from the source 15, modulates the group frequency wave of audio frequency $f_K$ from the source 13, in the modulator 14, the resulting modulated wave in turn being applied to modulator 12 to modulate the ultra short wave from the source 10. The source 15 has a frequency equal to the frequency of rotation of the directional radiating loop radiator 16, which is continuously rotated on a vertical axis by the motor 17. The switching device 20 alternately opens and closes contacts 21 in the circuit of radiator 11, while alternately closing and opening, respectively, the contacts 22 in the circuit transmitting waves to radiator 16, the contacts preferably operating through one complete cycle in the same period of time as one cycle of rotation of the directive radiator 16 and one cycle of the wave of frequency $f_U$. When contacts 22 are closed, the modulator 18 modulates the short waves from source 10 in accordance with the group frequency wave from the source 19, having an audio frequency $f_R$ differing from the group frequency $f_K$ from source 13. The phase of the wave of frequency $f_U$ from source 15 which modulates the short wave on radiator 11, may be adjusted relatively to the phase of the phase of rotation of directive radiator 16, by means of the phase shifter 23.

Figure 2:
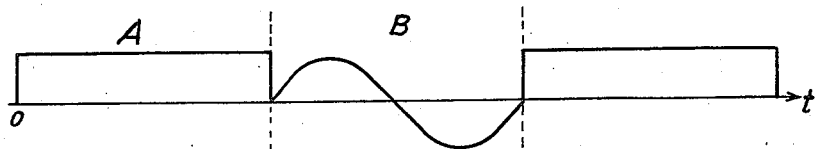

In Fig. 2 one revolution of the directional diagram A is plotted with respect to the time line $t$ as abscissa axis. This revolution alternates with the broadcast diagram B which is modulated with the rotational frequency of the directional radiation pattern. Both diagrams or patterns are emitted during equal periods, namely, $\frac{1}{50}$ of a second in the present case, this being the time during which the directive pattern makes one revolution.

Figure 3:
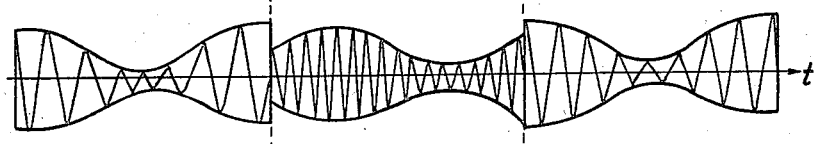

Fig. 3 shows the oscillations which arise on the receiving side in accordance with the two radiation patterns being emitted alternately. It has been assumed here that the receiver is remote by 90° from the zero or north direction. The phases are mutually displaced by 90°.

Figure 4:
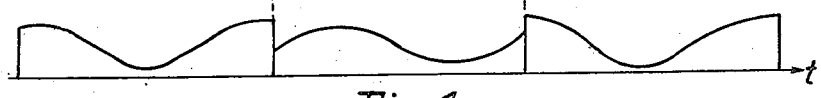

Fig. 4 illustrates the direct voltage varying in the rhythm of the rotational frequency after the frequencies $f_R$ and $f_K$ have been rectified.

Fig. 6 shows a receiver output circuit comprising two oscillatory circuits 1, 2 by which only that frequency is transmitted to which they are tuned. For instance, circuit 1 may be tuned to the frequency $f_K$ of the broadcast pattern while circuit 2 is tuned to the frequency $f_R$ of the directional pattern. The frequencies $f_K$, $f_R$ are separately rectified through a two-way rectification 7, 8 and are then brought to drive the motors $M_1$, $M_2$ of a phase testing device, having a differential gearing 30, in which the planetary gears 31 carry the pointer 32 over the scale 33, as stated before.

The arrangement may be such that the direct voltages pulsating in accordance with the rotational frequency of the directive pattern are separately conveyed to two oscillatory circuits 3, 4 tuned to the rotational frequency $f_U$ and impulsed by the pulsating direct voltage. The circuits 3, 4 hence each oscillate in accordance with the rotational frequency, that is, 50 cycles in the present case. Their oscillations, however, are out of phase as represented in Figs. 5a, 5b. Fig. 5a shows the oscillation produced by the directive pattern, while Fig. 5b represents the oscillation produced by the broadcast pattern. These alternating currents act to control electron tubes, 5, 6 from the anode circuit of which the alternating currents for feeding the phase testing device are taken.

It is not necessary that a complete revolution of the directive pattern be made to alternate with a broadcast pattern emitted during a period equalling the time taken by this revolution. The change may be much quicker, that is to say, during the said period of $\frac{1}{50}$ of a second the transmitter may be made to change more than once from one radiation pattern to the other.

Equally, the emission period of each radiation pattern may be calculated so that the directional pattern revolves more than once before the transmitter is switched.

What is claimed is:

1. In a direction finding system wherein on the transmitting side a rotating directive radiation pattern and a broadcast radiation pattern are produced by a radio beacon, while on the receiving side the phase conditions of the two radiation patterns are compared with each other, the method which consists in emitting both of these radiation patterns by the same transmitter of said radio beacon, rotating the directional radiation pattern through an angle of one complete revolution, then emitting the broadcast radiation pattern during a period equal to the time taken by the complete revolution of the directional radiation pattern, the two radiation patterns being alternately emitted.

2. In a direction finding system wherein on the transmitting side a rotating directive radiation pattern and a broadcast radiation pattern are produced by a radio beacon fed by a single transmitter, while on the receiving side the phase conditions of the two radiation patterns are compared with each other, the method which consists in modulating an audio frequency with the rotational frequency of the directional radiation pattern, modulating the said transmitter, while it is emitting the broadcast radiation pattern, with the voice frequency so modulated, modulating this transmitter, while it is emitting the directional radiation pattern, with an audio frequency different from the former, and thereby alternately transmitting the directional radiation pattern and the broadcast radiation pattern.

3. The method according to claim 2, in which the radiated waves are received, said audio frequency waves of different frequency are separately detected, said detected waves are separately rectified, and the phase relation between the resulting rectified waves is utilized to indicate the direction of reception of the radio waves.

4. The method according to claim 2, in which the radiated waves are received, said audio frequency waves of different frequency are detected, the resulting detected waves are separately rectified to produce a wave frequency corresponding to that of rotation of said directive radiation pattern, and the resulting rectified currents of said rotational frequency are compared to determine the direction of reception of said radio waves.

5. In a receiver for a direction finding system in which a radio wave is modulated by two group frequency waves of different audio frequency and in which each of said group frequency waves is separately modulated in accordance with a wave of lower frequency but in independent phase relation, a circuit for detected radio waves received in said system, means for separately selecting from said circuit, said waves of group frequency, means for indicating the phase relation between said group waves and for maintaining said indication during periods when either of said waves are temporarily discontinued.

6. In a receiver for a direction finding system in which a radio frequency wave is modulated by two waves of different audio group frequencies, each of said audio waves being separately modulated in accordance with a wave of lower frequency but in independent phase relation, said two modulated waves being transmitted alternately, a detection circuit for said transmitted waves, means for separately selecting the wave groups from said circuit, and means for indicating the phase relation between said wave groups and for continuously maintaining said indication during the periods when said wave groups are alternately discontinued.

7. A direction finding system receiver as set forth in claim 6, in which the phase relation indicating means comprises means including a rotor having substantial inertia for indicating the phase of each wave group, said inertia being sufficient to maintain the phase indication through the period when a group is discontinued during transmission of the other group.

ERNST MÜLLER.